United States Patent [19]

Langlitz et al.

[11] E Re. 31,566

[45] Reissued Apr. 24, 1984

[54] COOLING STRUCTURE FOR A METALLURGICAL FURNACE

[75] Inventors: Karl-Heinz Langlitz, Mülheim (Ruhr); Wolfgang Jansa, Moers-Asberg, both of Fed. Rep. of Germany; Karl H. Mahringer, deceased, late of Duisburg-Hamborn, Fed. Rep. of Germany; by Christine Mahringer, heir; by Wolfgang L. Mahringer, heir, both of Geldern, Fed. Rep. of Germany

[73] Assignee: Mannesmann Demag Aktiengesellschaft, Dusseldorf, Fed. Rep. of Germany

[21] Appl. No.: 69,189

[22] Filed: Aug. 23, 1979

Related U.S. Patent Documents

Reissue of:

[64] Patent No.: 3,601,379
Issued: Aug. 24, 1971
Appl. No.: 819,322
Filed: Apr. 25, 1969

[30] Foreign Application Priority Data

Jun. 27, 1968 [DE] Fed. Rep. of Germany ..... 1758562

[51] Int. Cl.[3] ..... C21C 5/46

[52] U.S. Cl. ..... 266/192; 165/169; 266/241; 432/237

[58] Field of Search ..... 266/192, 241; 165/169; 432/237

[56] References Cited

U.S. PATENT DOCUMENTS

| | | | |
|---|---|---|---|
| 2,186,740 | 1/1940 | Teeters | 432/412 |
| 2,222,004 | 11/1940 | Smith | 13/9 |
| 2,661,200 | 12/1953 | Ohlander | 432/219 |
| 3,034,776 | 5/1962 | Hennenberger et al. | 432/116 |

FOREIGN PATENT DOCUMENTS

| | | | |
|---|---|---|---|
| 261647 | 5/1968 | Austria | 266/241 |
| 555093 | 3/1958 | Canada | 266/241 |
| 556462 | 4/1958 | Canada | 266/241 |
| 578725 | 6/1933 | Fed. Rep. of Germany | 266/241 |
| 849853 | 9/1952 | Fed. Rep. of Germany | 266/241 |
| 1103952 | 4/1961 | Fed. Rep. of Germany | 266/241 |
| 1189098 | 3/1965 | Fed. Rep. of Germany | 266/241 |
| 39-23066 | 10/1964 | Japan | 266/241 |
| 40-23764 | 10/1965 | Japan | 266/241 |
| 1082586 | 9/1967 | United Kingdom | 266/241 |

*Primary Examiner*—M. J. Andrews
*Attorney, Agent, or Firm*—Toren, McGeady and Stanger

[57] ABSTRACT

A metallurgical vessel includes a cylindrical portion which is supported on a ring carrying a tilting spindle which is mounted for pivotal tilting movement of the vessel. The vessel includes a frustoconical mouth portion at its upper end which terminates in a mouth ring of reinforced construction. The construction includes a cooling arrangement for the mouth portion which comprises a plurality of groups of coils which are wound around the mouth portion and which are advantageously wound in the form of a multistart screw thread. Each group of coils includes an inlet and an outlet which is connected to a distributor through suitable valves. This distributor in turn is connected through a main distribution pipe which extends through an opening in the tilting ring and the tilting spindle and is connected to a source of fluid cooling medium through a rotary seal at the outer end of the tilting spindle.

11 Claims, 11 Drawing Figures

COOLING STRUCTURE FOR A METALLURGICAL FURNACE

Matter enclosed in heavy brackets [ ] appears in the original patent but forms no part of this reissue specification; matter printed in italics indicates the additions made by reissue.

SUMMARY OF THE INVENTION

This invention relates, in general, to the construction of a metallurgical vessel, and in particular, to a new and useful steel mill converter having a wall which is partly hollow or which includes a plurality of cooling tubes therein which are connected to a common cooling fluid medium distributor.

Metallurgical vessels are subjected to natural stresses by the heat of their molten liquid content. The heat will flow through the masonry lining and reach a particular magnitude in some smelting processes. In the oxygen blast method the carbon oxide gas stemming from the refining operation leads to an after burning of the waste gases particularly inside the vessel due to an excess in the supply of oxygen. The melting of the lining and the costs of operation in which many changes occur permits a considerable amount of heat to enter the shell of the vessel so that the latter is stressed in some zones to a permanent deformation. The more the lining is worn, the more the temperature in the vessel shell will rise particularly during the period of the shocklike heat generation which takes place during the blasting period. Since the support for the lining of the vessel depends on the rigidity of the vessel shell, a cooled wall results in less stress and less tendency to warping.

Various measures for effecting the cooling of the vessel walls are known. First of all the vessel can be equipped with a double wall at least in the area of the mouth whereby the coolant is conducted through the tilting spindle itself. Double walls are not only hard to manufacture, they are very expensive. If despite the cooling, a conversion of the coolant into steam takes place due to local heating of the inside wall (referred to by a steel worker as a 'red cheek'), the cooling effect will [dimension] *diminish* quickly and the danger of the complete breakthorugh will exist which would lead to [the entire coolant rolling out]*complete loss of the coolant*. The vessel will then need [a] repair which cannot be carried out during a blasting pause. A repair of such damage requires the shutdown of the vessel and this is associated with great expense, as is known.

According to another known suggestion, the vessel wall is formed of tubes through which a coolant flows. Even if the basic shape of the vessel is assembled of individual subassemblies, there still remains a problem of imposing upon the joints between two adjacent tube rings the weight of the masonry lining and the vessel payload. Such a joint, produced by rubbing, will have a tension of its own due to manufacturing reasons alone, and this may lead to the tube material cracking under load. A leak in the tube will cause it to rush into the pipeline system and result in a development of heat insulation steam bubbles. It is not very economical to cool the vessel because of the uneven heating which occurs at the bottom and at the mouth thereof. The quantity of cooling required, the number of connections and the operating supplies will increase disproportionately when compared to the result achieved. The exchange of single tubes appears virtually impossible because welding cannot be performed from the inside, but the vessel is exposed to severe external influences which can hardly be circumvented in the rough atmosphere of the smelting facility.

It is known to cool parts of the vessel adjacent the mouth by the provision of mouth rings which are disposed so that there is an air gap between the rings and the shell of the vessel. In addition, a hollow space is provided in the interior of the mouth rings through which cooling water is conducted to dissipate any heat from the mouth area which may develop by heat conduction. Mouth rings are cooled not only to protect the vessel, but [rather] *also* to prevent too firm a connection of what is ejected from the converter with the shell of the vessel. Cracking of the overstressed mouth rings is prevented by forming the ring of segments which are of a special cast material. Therefore, each of the mouth ring segments require pipelines for the supply and the drainage of cooling water.

In accordance with the present invention, the drawbacks of the prior art are eliminated in respect to the unsafe locations of the cooling coils and the locating of the cooling coils adjacent the mouth portion of the vessel so that in the case of damage, [neither] the cooling effect need not be interrupted [nor] *and* the vessel *need not* be put out of operation during the metallurgical process. To solve this problem the inlets and the outlets of the several cooling coils are connected to a common coolant distributor. When one coil fails, the others will remain functional. With the inventive arrangement, two or more [groups of coils] *coils of a group* are separately connected at their inlets to an inlet distributor and at their outlets to an outlet distributor. If one of the coils happens to fail, the others, of course, will function and the cooling coils are laid out over the surface of the vessel in a manner such that a neighboring cooling coil can take over a portion of the cooling assignment of a coil which fails should it become necessary. The distributor advantageously includes a cutoff valve for each coil so that the drainage of the coolant can be stopped immediately if there is a failure of one of the coils. This is a very important arrangement because, in practice, parts of the charging equipment bump against the vessel over and over again, and it must be considered that during the removal of the converter slag there will be considerable bumping of the mouth area during the transportation of the vessel.

In order to obtain a wide cooling effect of a pipeline which is usually laid in a loop form, the cooling coils are advantageously installed so that each individual cooling coil runs around the vessel in one or several windings with a spacing between coils. The layout, for example, may comprise a form of a so-called multistart screw thread.

The arrangement of the cooling coils in accordance with the invention permits the coils to be subjected to a much more intensive cooling action. When a double wall construction is used for cooling a vessel, there is a danger of local overheating due to lack of a sufficiently rapid heat transfer from the heated part to the coolant. With the multicoil arrangement of the invention, this disadvantageous effect is eliminated and the arrangement goes hand in hand with the operational requirements.

In accordance with the invention, the cooling coils are advantageously provided by a half tubular element which is fitted directly to the exterior wall of the vessel mouth portion, so that the vessel wall, together with the half portion of the tube, defines the individual cooling flow channel. In this manner the coolant is in direct contact with the wall of the part of the vessel to be cooled. Thus, the heat transfer resistance of the coolant is correspondingly lower. In addition, the half tubular elements can be easily welded to the vessel using welding seams which are always accessible and which can be rewelded over and over again without having a breakdown in operations. The arrangement is such that the operator can perform such jobs reliably without outside help.

In contrast to the many suggestions which have not found acceptance in practical application, the invention provides an improved means for connecting the coolant lines to a source of coolant using improved cooled fittings. A clear and easily accessible arrangement is provided by extending the ends of the cooling coils around the mouth cap of the steel mill converter to a distributor which is disposed in the area of the converter carrying ring, so that the distributor may be connected to a coolant main line which extends through the carrying hollow tilting spindle. There is always a natural temperature difference between the carrying ring and the vessel which difference requires a heat expansion capability of the two parts in order to protect the lines against material damage. This is solved by the invention by the provision of an expansion compensator located between the carrying ring and the distributor on the vessel. Such a compensator bridges the connection between the carrying ring and the vessel to accommodate different heat expansion of these two parts in several directions.

The invention is particularly [application] *applicable* for metallurgical converters which must be tilted for emptying or for other purposes. A rotary seal at the outlet end of the tilting spindle serves as a connection between the main line and a fixed coolant removal station adjacent the mounting for the spindle. Rotary seals can be made to require little service for high pressures and long operating periods. Accordingly, this arrangement represents a solution adaptable to the low conditions.

Accordingly, it is an object of the invention to provide an improved metallurgical vessel construction having a wall which is cooled by a plurality of separate cooling coil circuits, each circuit being individually connected to a distributor.

A further object of the invention is to provide a metallurgical vessel construction which includes a cylindrical portion suspended on a lifting ring carrying a pivotal spindle member and including a frustoconical mouth portion having a plurality of cooling coils wound there around arranged in cooling coil circuits, each of which includes coils which are located adjacent a coil in another circuit, the coils being connected to a distributor and through a connecting coolant fluid main which extends through the hollow tilting spindle.

A further object of the invention is to provide a metallurgical vessel with cooling channels defined by the vessel wall and by half-cylindrical tubes welded to the vessel wall.

A further object of the invention is to provide a metallurgical vessel construction which is simple in design, rugged in construction and economical to manufacture.

The various features of novelty which characterize the invention are pointed out with particularity in the claims annexed to and forming a part of this specification. For a better understanding of the invention, its operating advantages and specific object attained by its use, reference should be had to the accompanying matter in which there is illustrated and described a preferred embodiment of the invention.

DETAILED DESCRIPTION OF THE PREFERRED EMBODIMENT

Figure 1:
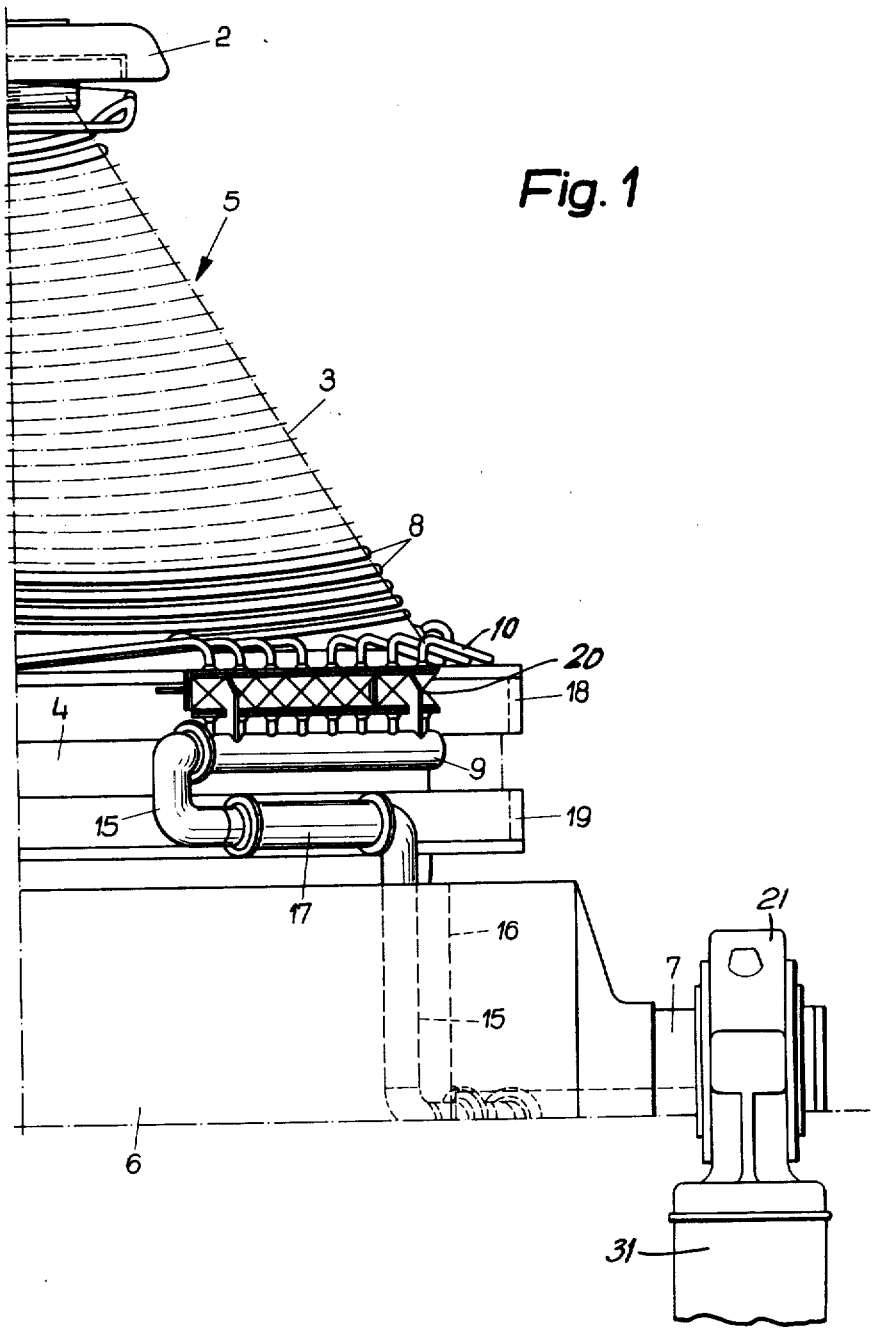
FIG. 1 is a partial side elevational view of a metallurgical vessel constructed in accordance with the invention.

Referring to the drawings in particular, the invention embodied therein comprises a metallurgical vessel generally designated 5 having a mouth ring 2 located at the top of a frustoconical mouth cap 3. The mouth cap 3 is secured to the upper end of a cylindrical part 4 which is supported within a carrying ring 6. The carrying ring 6 has a tilting spindle 7 which is suitably mounted in means (not shown) for permitting the tilting or pivotal movement of the ring with the vessel. The mouth ring 2 may be made of a heat-resistant material and is dimensioned sufficiently to provide sufficient strength at this location. However, the cap can be formed only to a thickness which can be easily achieved with the available machinery. In addition, it has been found that a greater thickness of a cap 3 brings substantially no advangtages because of the great heat tensions to which this part is subjected.

In accordance with the invention the mouth cap 3 is cooled by a system of cooling coils 8 which are arranged around and in contact with the exterior surface thereof and this enables the utilization of the natural material strength of this part of the vessel.

Figure 2:
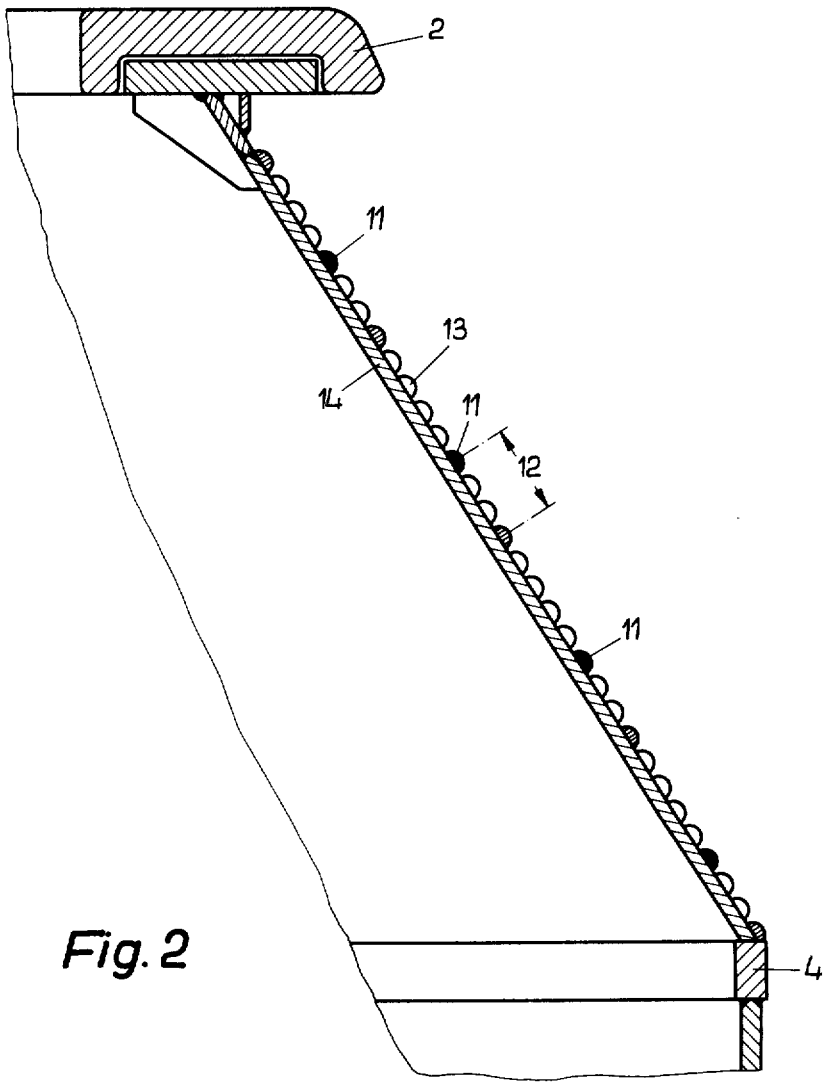
FIG. 2 is an axial sectional view of the portion of the vessel indicated in FIG. 1.

In the preferred arrangement of a plurality [of groups] of the cooling coils 8 are arranged *in a group* in special circuit form around the mouth cap 3. The inlets 10 emanate from a distributor 9 and the outlets (not shown) are connected to a similar distributor. Depending on the size of the vessel 5 each of the cooling coils 8 has about from 3 to 4 windings 11. Each circuit is laid out so that it has a winding of another circuit directly on each side thereof and this arrangement is achieved, for example, by laying the tubular conduits in a manner of a multistart screw thread. The distance 12 indicated in FIG. 2, between two adjacent winding 11 may be reduced by the interposition of additional cooling coils 8 to thereby increase the number of starts and the cooling output.

A feature of the construction is the formulation of the cooling coils which, in the embodiment illustrated, comprises a half tubular portion 13 which is closed by a shell portion 14 of the wall or shell 14 of the mouth cap 3. The half tubular portion may be joined by external welding seams to the wall 14 or by the use of special process by which a press fit is established continuously by electric induction heating which may be carried out in a protective atmosphere.

The distributor 9 is connected by a main supply line 15 which leads through an opening 16 in the carrying ring 6 and extends through the hollow tilting spindle 7 to a fixed coolant removal station (not shown). The main line 15 communicates with the fixed coolant station through a rotary seal (not shown) so that it does not interfere with the tilting movement of the vessel and its supporting spindle 7.

The distributor 9 is fastened to the reinforcing rings 18 and 19 which are carried on the cylindrical portion 4 of the vessel 5. Heat expansion between the carrying ring 6 and the vessel 5 are bridged by heat expansion compensator 17 which interconnects the portions of the main conduit 15 at this bridging location. Shutoff valves 20 are provided for each cooling coil circuit which consists of several windings 11. Accordingly, the implementation which is shown includes eight independent cooling coil circuits and a corresponding number of shutoff valves 20.

The [principal] *principle* of the use of independent cooling coils 8 arranged in groups or circuits can be applied to a multiplicity of designs. For a greater number of coils 11 with a higher number of starts of the screw threads, the main line 15 can be equipped, for instance, with additional distributors 9 all around the carrying ring 6. The invention is also applicable to other types of furnaces or vessels which have no round cross section. In addition, it is not necessary to maintain a helical-type circuit but, for example, the cooling coils 8 may take the course approximately in the direction of the longitudinal centerline of the vessel to provide, for example, curve-simulating garlands.

The pivot pin 7 is supported on a pivot bearing 21, which is mounted on a foundation 31. The pivot pin 7 is hollow, as indicated in the drawings and it carries a rotary packing 22 at its outer end. The rotary packing 22 comprises a tube 23, which is connected with the pivot pin 7 and which terminates in a flanged ring 24. The flanged ring 24 bears against a nonrotating flanged ring 25 of about the same size. A packing ring 26 is inserted between the two flanged rings 24 and rotatably mounted in the housing 28 and these two parts form the rotary packing. The connecting tube for the outflow of liquid is secured to the housing 28 and it opens into the main line 30, which is fed from lines in the interior of the foundations 31.

What is claimed is:

1. A metallurgical vessel construction, comprising a vessel having an exterior wall which is subjected to high temperatures, a plurality of [groups of] *individual discrete* coolant conduits positioned at a plurality of locations over said wall *each defining a discrete fluid flow path for coolant extending* to cover at least a *widely distributed* portion of a defined area of said wall for cooling said wall, [a separate] coolant supply *means* for each conduit, [each of said groups including a plurality of separate coolant conduits and] each conduit being connected *respectively* to [a respective one of] said coolant supply *means*, [and ] said conduits [of each of said groups] being located alongside each other in each location so that there is always one of said [separate] *discrete* coolant conduits located adjacent each other [so] *to* [that both] cover [and] adjacent [area] *areas* of said wall, [whereby at least one of said conduits will be effective in each groups even though another] *and valve means for enabling said coolant conduits to be individually shut off to terminate fluid flow therethrough, said conduits being arranged so that if any* of said conduits is ruptured or disconnected from its coolant supply, *any one of the other of said conduits through which fluid flow is maintained will provide a cooling effect which is widely distributed through the area of said wall to be cooled to compensate for the loss of conduits through which fluid flow is terminated.*

2. A metallurgical vessel, according to claim 1, including a distributor for connecting [said groups of] said conduits to said fluid coolant supply, each of said [groups of] conduits being connected to said distributor.

3. A metallurgical vessel, according to claim 1, wherein said [groups] *conduits* are formed as continuous windings [of] *with* at least two separate conduits extending around said wall.

4. A metallurgical vessel, according to claim 2, wherein said [groups of] conduits comprise at least three separate conduits wound continuously around said wall, said wall being tubular and said conduits being in closely spaced side-by-side relationship.

5. A metallurgical vessel construction, [comprising a vessel having an exterior wall, a plurality of groups of conduits defined over said wall with at least one of the conduits of one group being adjacent at least one of the conduits of another group, means for connecting said groups of conduits to a fluid coolant,] said conduits [comprising] *comprise* a partial tubular wall portion located over said vessel, said vessel wall [closing] *completing* said partial tubular conduit.

6. A metallurgical vessel construction[, comprising a vessel having an exterior wall, a plurality of groups of conduits defined over said wall with at least one of the conduits of one group being adjacent at least one of the conduits of another group, means for connecting said groups of conduits to a fluid coolant,] said vessel [including] *comprise* a cylindrical wall portion and a frustoconical mouth cap portion, [said groups of said] conduits comprising coils distributed over said mouth cap portion.

7. A metallurgical [vessel, comprising] *vessel construction according to claim 1, further comprising* a cylindrical wall portion and an upper mouth cap portion, a supporting ring extending around said cylindrical portion and having a hollow tilt spindle adapted to be pivotally mounted for tilting said vessel with said [support] *supporting* ring [a plurality of loops of conduits defined over said mouth cap portion wall with at least one of the conduits of one group being adjacent at least one of the conduits of another group, and means on said vessel for connecting said groups of said conduits to said fluid coolant.]

8. A metallurgical vessel according to claim [6,] 7, wherein said means [for connecting said groups of conduits to a fluid coolant] *coolant supply* comprises a conduit extending through said hollow tilt spindle.

9. A metallurgical vessel, according to claim 8, including a distributor carried on said vessel, each of said [groups of] conduits being separately connected to said distributor, a main conduit connected to said distributor, *said* valve means *being connected* between said distributor and each of said [groups of] conduits.

10. A metallurgical vessel, according to claim 9, wherein said main conduit extends through *said* hollow spindle and is adapted to be connected to a station fluid coolant supply said main conduit having an expansion portion therein located between said supporting ring and said vessel.

11. A metallurgical vessel, according to claim 10, including a rotary seal adjacent said hollow tilt spindle for connecting said main conduit to a fluid coolant.

* * * * *